Patented Dec. 12, 1950

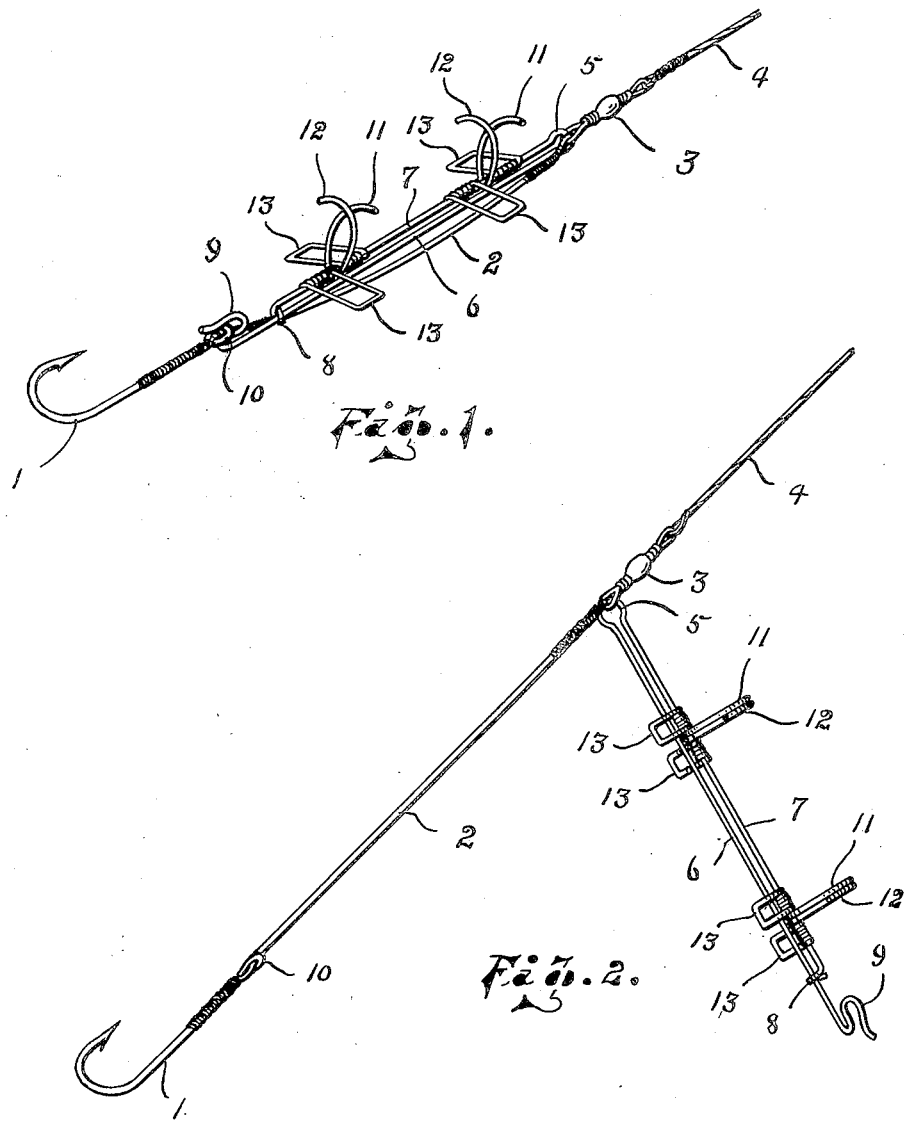

2,533,390

UNITED STATES PATENT OFFICE 2,533,390

LIVE BAIT HOLDER

Henry Miller, Superior, Wis.

Application June 15, 1946, Serial No. 677,052

1 Claim. (Cl. 43—44.6)

This invention relates to fishing lures, and has special reference to an improved type of device for holding live bait adjacent a fish hook.

Among the objects of the invention are simplicity of construction and inexpensive manufacture.

Another object is the provision of a device whereby bait may be used for catching more than one fish.

A more specific object of the invention is to provide a bait holding device wherein bait is held adjacent a fish hook in such a manner that as soon as a fish pulls on the fishing hook, the bait is released and swings away from the hook so as not to be damaged by the fish.

Other objects and advantages of the instant invention will become more apparent as the description proceeds.

Referring now to the accompanying drawing forming part of this application:

Fig. 1 is a perspective view of a single hook and leader equipped with one of my improved bait holders.

Fig. 2 is a similar view of the same hook and leader after the bait holder has been released from the hook.

In the drawing, reference numeral 1 represents the hook, which is provided with a relatively limber leader 2, the latter being attached to the swivel 3 from the end of the fishing line 4.

The body of the bait saver is formed of a single piece of wire comprising two substantially parallel wire members 6 and 7 joined by means of the bight 5 which extends through the eye of the swivel 3 to form means by which the device is carried on the fishing line. The end of the wire 7 is formed to a hook 8 and is engaged on to the wire 6 adjacent the end of the latter, as shown, to interlock the members 6 and 7, and thus form a unitary body member. The free end of the wire 6 has a goose-neck like hook 9 formed thereon, as shown.

The friction hook 9 is, in operation, engaged with the eye 10 of the fishing hook 1, the engagement being frictional so that it may be released very readily. When the hook 9 is thus engaged, the leader 2 must have sufficient slack, as clearly seen in Fig. 1, to allow the hook 1 to be released from the hook 9 when a fish pulls on the hook 1.

As means to hold live bait, such as minnows or the like in position for fishing, a pair of spring saddles, or the like, are mounted on the wire member 7, as shown. Each so-called saddle comprises a pair of arcuate overlapping tines 11 and 12, which may be formed by the termini of a single piece of piano wire wound tightly around the body wire 7, as shown. These saddles are wound upon the body wire so as to provide the angularly depending thumb and finger bights 13—13 for each saddle. The winding of one tine terminal is reversed to that of the other tine terminal so that the tines are biased in opposite directions, and the bights 13—13 extend on opposite sides of the wire 7, thereby permitting the tines 11 and 12 to be opened by squeezing the bights 13 toward each other.

It is deemed obvious that should a fish pull on the hook 1, the bait holding device will be released from its normal fishing position and will swing away from the hook where the fish cannot contact same and damage the bait so that it cannot be used for further fishing.

Having thus described one embodiment of the invention, what I claim is:

In combination with a fishing hook and leader, a bait saving device comprising a wire body portion having one end pivotally secured at the upper end of said leader, a friction hook formed at the opposite end of said body portion, and bait holding means carried by said body portion intermediate of the ends thereof, said friction hook being engageable with the upper end of said fishing hook to hold said body portion in substantially parallel relation with said leader, with said leader having a slight amount of slack whereby a pull on said fishing hook will take up said slack and disengage said friction hook from its connection to said fishing hook to permit said bait saving device to swing away from said fishing hook.

HENRY MILLER.

REFERENCES CITED

The following references are of record in the file of this patent:

UNITED STATES PATENTS

| Number | Name | Date |
|---|---|---|
| 1,003,962 | Henning | Sept. 19, 1911 |
| 1,114,698 | Lane | Oct. 20, 1914 |
| 1,320,570 | Reynolds | Nov. 4, 1919 |
| 1,464,571 | Hanson | Aug. 14, 1923 |
| 2,425,587 | Zuravsky | Aug. 12, 1947 |

FOREIGN PATENTS

| Number | Country | Date |
|---|---|---|
| 367,701 | Great Britain | Feb. 25, 1932 |